United States Patent
Ogami et al.

(10) Patent No.: US 7,240,578 B2
(45) Date of Patent: Jul. 10, 2007

(54) GEARING AND POWER TRANSMISSION APPARATUS

(75) Inventors: Shiro Ogami, Kariya (JP); Toshio Tanba, Kariya (JP)

(73) Assignee: Aisin Ai Co., Ltd., Nishio-Shi, Aichi-Ken (JP)

( * ) Notice: Subject to any disclaimer, the term of this patent is extended or adjusted under 35 U.S.C. 154(b) by 199 days.

(21) Appl. No.: 11/152,088

(22) Filed: Jun. 15, 2005

(65) Prior Publication Data

US 2005/0284242 A1 Dec. 29, 2005

(30) Foreign Application Priority Data

Jun. 15, 2004 (JP) .............................. 2004-176587

(51) Int. Cl.
*F16H 3/28* (2006.01)
*F16H 63/32* (2006.01)

(52) U.S. Cl. ...................................... 74/340; 74/473.37
(58) Field of Classification Search .................. 74/340, 74/473.36, 473.37

See application file for complete search history.

(56) References Cited

U.S. PATENT DOCUMENTS 6,845,685 B2 * 1/2005 Brandwitte et al. ...... 74/473.25
6,874,381 B2 * 4/2005 Berger et al. ................. 74/335
6,990,871 B2 * 1/2006 Ebenhoch ....................... 74/74
7,155,994 B2 * 1/2007 Gumpoltsberger ........... 74/340
2004/0177714 A1 * 9/2004 Ronge ..................... 74/473.37

FOREIGN PATENT DOCUMENTS

| JP | 2003-532040 A | | 10/2003 |
| JP | 2005147403 A | * | 6/2005 |
| WO | 01/84019 A1 | | 11/2001 |

\* cited by examiner

*Primary Examiner*—Ha Ho
(74) *Attorney, Agent, or Firm*—Buchanan Ingersoll & Rooney PC (57) ABSTRACT

A transmission apparatus includes an interlock member having a restraining portion movable together with a shift and select member in a right-angled direction and, while fork heads are at neutral positions in the right-angled direction, extending in the right-angled direction along a notch of the tip end of each fork head. The restraining portion has a gap into which the tip end of each fork head extends. A dimensional relationship among an outer span of the tip end of each fork head, an inner span of the notch, an outer span of the restraining portion, an inner span of the restraining portion, a width of the tip end of the shift and select member, and a shift stroke of each fork head is set to be: H2−P1≧0; P2−H1+2S≧0; and H2−2S−I≧0.

4 Claims, 7 Drawing Sheets

GEARING AND POWER TRANSMISSION APPARATUS

CROSS REFERENCE TO RELATED APPLICATIONS

This application is based on and claims priority under 35 U.S.C. §119 with respect to Japanese Patent Application 2004-176587, filed on Jun. 15, 2004, the entire content of which is incorporated herein by reference.

FIELD OF THE INVENTION

This invention generally relates to a double clutch-type gearing and power transmission apparatus provided with an interlocking feature, by which occurrences of a double-gear engagement, or of a gear jump out, in a transmission, are capable of being avoided.

BACKGROUND

As an automated manual transmission apparatus for a vehicle, such as an automobile, although it has been conventionally believed that a fluid-type torque converter can be generally applied, consideration should be given preferably to that a transmission efficiency for transmitting a driving force of a driving power source, such as an engine, may on occasions be deteriorated due to a slip in transmitting the driving force, the slip which tends to occur in the fluid-type torque converter. In the light of the foregoing, suggestions have given to an automatic operation of a transmission apparatus that is provided with a gear-type manual transmission. As one of examples thereof WO2003-532040A discloses a double clutch-type gearing and power transmission apparatus. FIGS. 8 to 11 illustrates an outline of this apparatus.

In the first place, a gearing and power transmission mechanism of this double clutch-type gearing and power transmission apparatus is explained with reference to FIGS. 8 and 9. In this gearing and power transmission mechanism, an output from a driving shaft 31, such as an output shaft of an engine, is transmitted to a first input shaft 33 through a first clutch 32a of a twin-clutch assembly (a double-clutch assembly) 32, and is further transmitted through a second clutch 32b of the twin-clutch assembly 32 to a second input shaft 34 which is of cylindrical-shaped and is coaxially arranged at an outer periphery of the first clutch 32a. As is summarized in FIG. 9, the first clutch 32a and the second clutch 32b are controlled in such a manner that a transmission torque A is increased while the other transmission torque B is decreasing, and vice versa, for example in general, in such a manner that the transmission torque A is controlled at a predetermined torque value TO when the other transmission torque B is controlled to be zero, and vice versa. This gearing and power transmission mechanism is further provided with a first intermediate shaft 35 and a second intermediate shaft 36, which are both arranged in parallel with the first input shaft 33 and the second input shaft 34. On the first input shaft 33, the first intermediate shaft 35 and the second intermediate shaft 36, a first gear transmission mechanism 30A is mounted, which is capable of establishing four shift stages: a first shift stage; a third shift stage; a fifth shift stage; and a seventh shift stage. On the second input shaft 34, the first intermediate shaft 35 and the second intermediate shaft 36, a second gear transmission mechanism 30B is mounted, which is capable of establishing three shift stages: a second shift stage; a fourth shift stage; and a sixth shift stage. On the first input shaft 33 and the second intermediate shaft 36, a rearward shift stage gear train 47 is mounted The first and second intermediate input shafts 35 and 36 are respectively linked to an output shaft 38 when a gear 48a, which is mounted on the first intermediate shaft 35, and a gear 48b, which is mounted on the second intermediate shaft 36, are respectively engaged with a gear 48c, which is mounted on the output shaft 38.

The first gear transmission mechanism 30A incorporates, therein, a first shift stage gear train 40, a third shift stage gear train 42, a fifth shift stage gear train 46 and a seventh shift stage gear train 44. The first shift stage gear train 40 is configured with a gear 40a, which is fixedly mounted on the first input shaft 33, and a gear 40b, which is rotatably mounted on the first intermediate shaft 35. The third shift stage gear train 42 is configured with a gear 42a, which is fixedly mounted on the first input shaft 33, and a gear 42b, which is rotatably mounted on the first intermediate shaft 35. A first switching clutch 50 is mounted on the first intermediate shaft 35, the first switching clutch 50 which is switched among three positions: a first shift stage position to be engaged with the gear 40b side; a third shift stage position to be engaged with the gear 42b side; and a neutral position not to be engaged with any of the gear 40b side and the gear 42b side. The fifth shift stage gear train 46 is configured with the gear 42a, which is fixedly mounted on the first input shaft 33, and a gear 46b which is rotatably mounted on the second intermediate shaft 36. That is, the gear 42a is shared by the third shift stage gear train 42 and the fifth shift stage gear train 46. The seventh shift stage gear train 44 is configured with a gear 44a, which is fixedly mounted on the first input shaft 33, and a gear 44b, which is rotatably mounted on the second intermediate shaft 36. A third switching clutch 52 is mounted on the second intermediate shaft 36, the third switching clutch 52 which is switched among three positions: a fifth shift stage position to be engaged with the gear 46b side; a seventh shift stage position to be engaged with the gear 44b side; and a neutral position not to be engaged with any of the gear 46b side and the gear 44b side.

The second gear transmission mechanism 30B incorporates, therein, a second shift stage gear train 41, a fourth shift stage gear train 43, and a sixth shift stage gear train 45. The second shift stage gear train 41 is configured with a gear 41a, which is fixedly mounted on the second input shaft 34, a gear 41b, which is rotatably mounted on the first intermediate shaft 35. The fourth shift stage gear train 43 is configured with a gear 43a, which is fixedly mounted on the second input shaft 34, and a gear 43b, which is rotatably mounted on the first intermediate shaft 35. A second switching clutch 51 is mounted on the first intermediate shaft 35, the second switching clutch 51 which is switched among three positions: a second shift stage position to be engaged with the gear 41b side, a fourth shift stage position to be engaged with the gear 43b side, and a neutral position not to be engaged with any of the gear 41b and the gear 43b. The sixth shift stage gear train 45 is configured with a gear 45a, which is fixedly mounted on the second input shaft 34, and a gear 45b, which is rotatably mounted on the second intermediate shaft 36. The rearward shift stage gear train 47 is configured with the gear 40a, which is fixedly mounted on the first input shaft 33, gears 47a and 47b, which both are fixedly mounted on a reverse shaft 37 that is arranged in parallel to the shafts 33, 34, 35 and 36, and a gear 47c which is rotatably mounted on the second intermediate shaft 36. That is, the gear 40a is shared by the first shift stage gear train 40 and by the rearward shift stage gear train 47. A fourth switching clutch 53 is mounted on the second intermediate shaft 36, the fourth switching clutch 53 which is switched among three positions: a sixth shift stage position to be engaged with the gear 45b side; the rearward shift stage position to be engaged with the gear 47c; and a neutral position not to be engaged with any of the gear 45b and the gear 47c.

The first, second, third and fourth switching clutches 50, 51, 52 and 53 are automatically and selectively operated, by a controller (not illustrated), among the respectively three positions by use of the first and second clutches 32a and 32b, and first, second third and fourth shift forks 61A, 61B, 61C and 61D. The controller calculates, on the basis of a vehicle driving condition such as an accelerator opening degree, a vehicle speed and an engine rotational speed, a shift stage that is appropriate to the vehicle driving condition, and further controls each clutch 32a, 32b, 50, 51, 52 and 53 in such a manner of establishing the shift stage which is a result of the aforementioned calculation. Under a normal condition, the first and second clutches 32a and 32b are both controlled in such a manner that the respective transmission torque are increased and decreased contrarily to each other, as described above. On the other hand, when an engine is being inactivated, and a vehicle is not moving, the first and second clutches 32a and 32b are both released from being controlled.

Next, explained below is operation of the first gear transmission mechanism 30A and the second gear transmission mechanism 30B.

When the twin-clutch assembly 32 is not operated, both the first and second clutches 32a and 32b are released from being operated or engaged, and the clutches 50, 51, 52 and 53 are controlled to the neutral positions. When an engine, which is being connected to the drive shaft 31, is activated at a vehicle stationary condition, the controller shifts, by use of the first shift fork 61A, the first switching clutch 50 to the first shift stage position. The first clutch 32a is then engaged at an event that an engine rotational speed reaches a predetermined rotational speed in response to increase of an opening degree of a throttle valve. Accordingly, the driving torque of the drive shaft 31 is transmitted from the first clutch 32a to the output shaft 38 via the first input shaft 33, the first shift stage gear train 40, the first switching clutch 50, the first intermediate shift 35, the gear 48a, and the gear 48c, whereby a vehicle starts driving with the first shift stage established in the transmission. At this state, in the eventuality of shifting up to the second shift stage, the controller shifts, the second switching clutch 51 of the second gear transmission mechanism 30B to the second shift stage position, by use of the second shift fork 61B. In a matter of time, when a vehicle driving condition, such as an accelerator opening degree, a vehicle speed, and an engine rotational speed, becomes appropriate for driving at a second shift stage, the controller terminates engagement of the first clutch 32a and establishes engagement of the second clutch 32b. Accordingly, the driving torque of the drive shaft 31 is transmitted from the second clutch 32b to the output shaft 38 via the second input shaft 34, the second shift stage gear train 41 of the second gear transmission mechanism 30B, the second switching clutch 51, the first intermediate shaft 35, the gear 48a and the gear 48c, whereby a vehicle driving is switched from the first shift stage to the second shift stage. When an actual vehicle driving condition is appropriate for further continuously shifting up, the controller, by use of the first shift fork 61A, shifts the first switching clutch 50 from the first shift stage position to the third shift stage position. In a matter of time, when an actual vehicle driving condition becomes appropriate for driving at the third shift stage, the controller terminates engagement of the second clutch 32b and establishes engagement of the first clutch 32a, whereby shifting to a vehicle driving at the third shift stage.

As described above, when an actual vehicle driving condition becomes appropriate for further continuously shifting-up, the controller controls one of the switching clutches 50, 51, 52 and 53 in such a manner that a gear train of a shift stage, which is one shift stage lower than a shift stage being currently established in the transmission, is released from being engaged, and a gear train of a shift stage, which is one shift stage higher than the shift stage being currently established in the transmission, is to be engaged. In a matter of time, when an actual vehicle driving condition becomes appropriate to a vehicle driving at the shift stage that is one shift stage higher, an engagement condition of the twin-clutch assembly 32 is switched. By repeatedly performing the above-described control in the transmission, a shift-up operation can be achieved. When an actual vehicle driving condition is appropriate for shifting down, the controller controls one of the switching clutches 50, 51, 52 and 53 in such a manner that the a gear train of a shift stage, which is one shift stage higher than a shift stage being currently established in the transmission, is released from being engaged, and a gear train of a shift stage, which is one shift stage lower than the shift stage being currently established in the transmission, is to be engaged. In a matter of time, when an actual vehicle driving condition becomes appropriate to a vehicle driving at the shift stage that is one shift stage lower, an engagement condition of the twin-clutch assembly 32 is switched. By repeatedly performing the above-described control in the transmission, a shift-down operation can be achieved. On the other hand, when a shift stage being currently established in the transmission is appropriate to an actual vehicle driving condition, the controller does not switch operations of the switching clutches 50, 51, 52 and 53, and of the first and second clutches 32a and 32b, and maintain the shift stage being currently established in the transmission.

In response to a manual reverse operation at a time that a vehicle is being stationary, the controller returns the first switching clutch 50 to the neutral position, as needed, and shifts the fourth switching clutch 53 to a rearward position. In a matter of time, when an engine rotational speed reaches a predetermined rotational speed in response to increase in a throttle opening degree, the first clutch 32a of the twin-clutch assembly 32 is engaged. Accordingly, the driving torque of the drive shaft 31 is transmitted from the first clutch 32a to the output shaft 38 via the first input shaft 33, the rearward gear train 47, the fourth switching clutch 53, the second intermediate shaft 36, the gear 48b and the gear 48c.

Next, described below is an operation by the first and second gearing and power transmission mechanisms 30A and 30B with reference to FIG. 8. The shift forks 61A, 61B, 61C and 61D, which are respectively engaged with peripheral grooves that are defined circumferentially on outer peripheries of the switching clutches 50, 51, 52 and 53, are respectively linked to fork heads 60A, 60B, 60C and 60D (illustrated in FIGS. 10 and 11) via respective fork shafts (not illustrated) that extend in parallel with the shafts 33, 34, 35 and 36. The fork heads 60A to 60D are arranged in such a manner that tip ends of the respective fork heads 60A to 60D are lined up in a right-angled direction with the first and second input shafts 33 and 34. The tip end of each fork head 60A to 60D is integrally formed with a reverse-C shaped notch 60a. The reverse-C shaped notches 60a of the fork heads 60A to 60D are arranged so as to overlap one another in a direction, which makes right angles with the first and second input shafts 33 and 34. The fork heads 60A to 60D can be moved in a shift direction, which is in parallel with an extending direction of the input shafts 33 and 34, and can fall within a range limited by stoppers S1 and S2 that are provided at both sides of each fork head Therefore, in response to movement of one of the fork heads 60A to 60D, the corresponding one of the shift forks 61A to 61D can be operated via the corresponding fork shafts, and then the corresponding one of the switching clutches 50, 51, 52 and 53 can be switched to either a position at which the clutch is engaged with a gear at one side; a position at which the clutch is engaged with a gear at the other side; or a neutral position. The shift and select member 62 moves within the notches 60a in a select direction, which makes right angles with both the input shafts 33 and 34, and then selects one of the plural fork heads 60A to 60D. In such circumstances, at an event that the shift and select member 62 moves in the shift direction, the fork head, which has been selected, can be moved in the shift direction. Accordingly, the shift fork corresponding to this fork head is operated so as to switch the position of the corresponding switching clutch.

Figure 8:
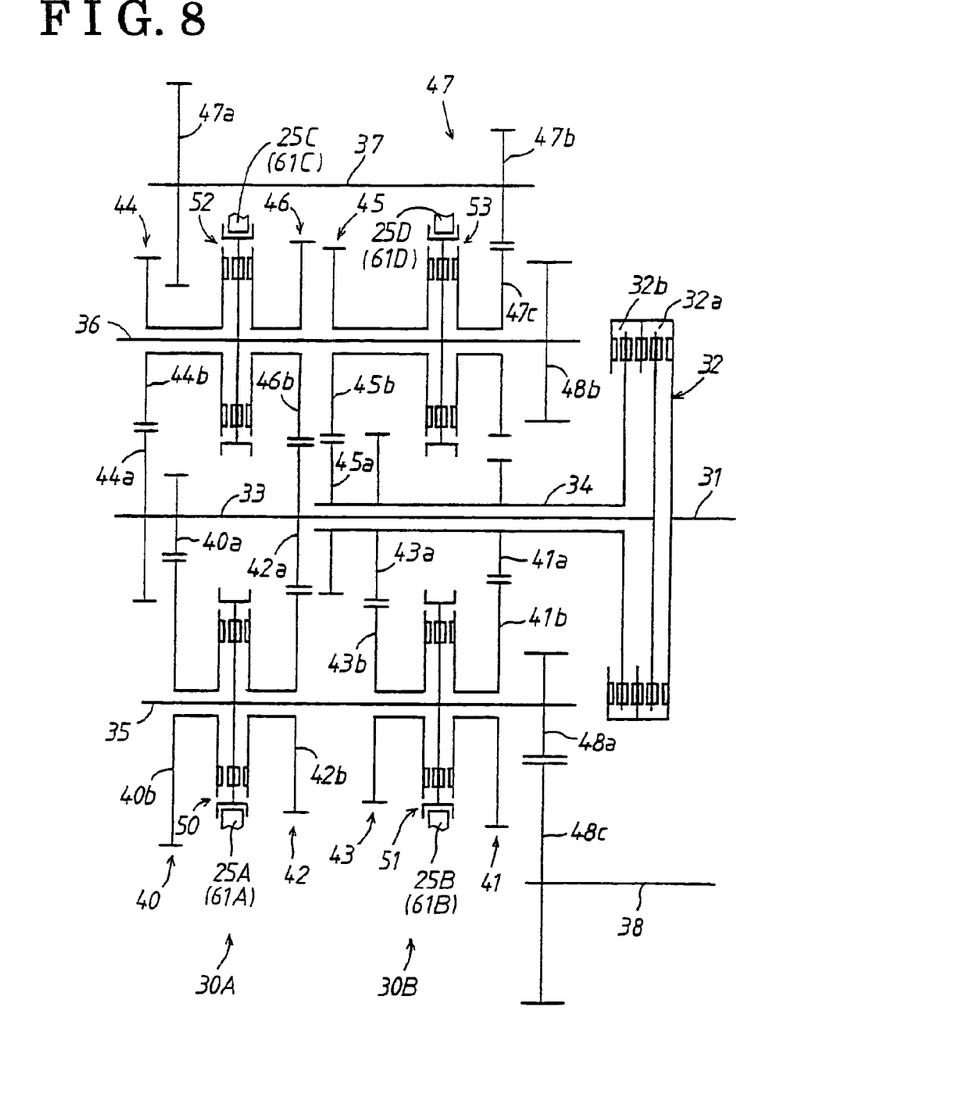
FIG. 8 is a view schematically illustrating the gearing and power transmission mechanism according to the embodiment of the present invention.
Figure 9:
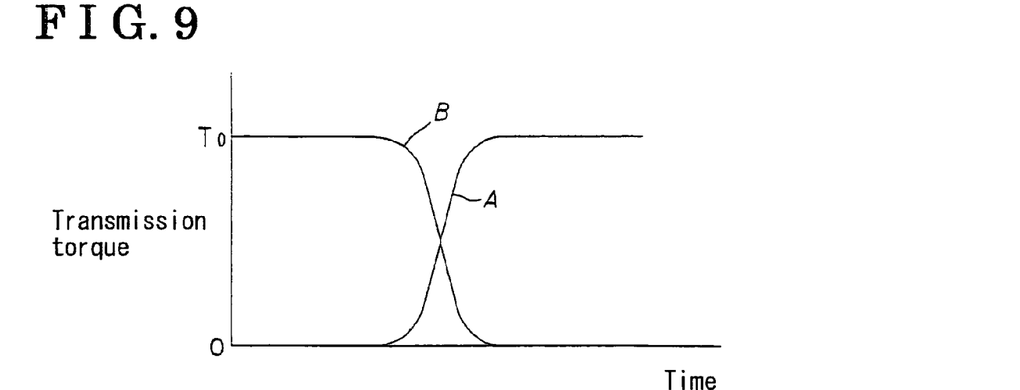
FIG. 9 is a diagram for explaining an operation of a twin-clutch assembly applied to the gearing and power transmission mechanism illustrated in FIG. 8.
Figure 10:
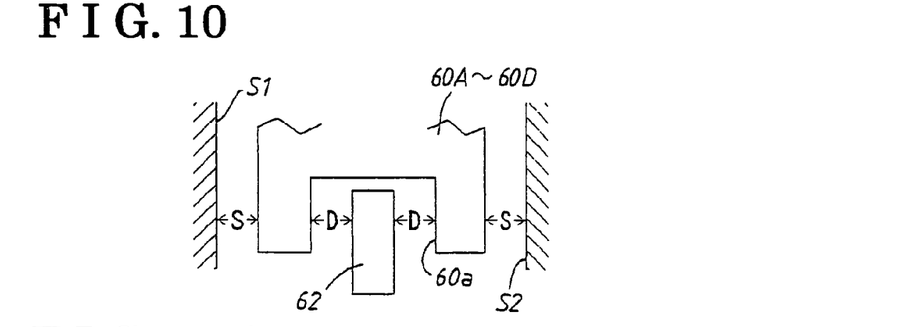
FIG. 10 is a view illustrating an operation mechanism for operating the gearing and power transmission mechanism of a conventional gearing and power transmission apparatus.
Figure 11A:
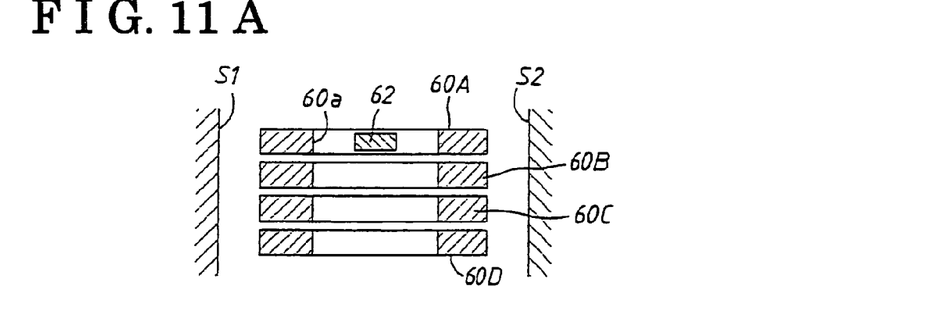
FIGS. 11A and 11B are the other view illustrating the operation mechanism illustrated in FIG. 10.
Figure 11B:
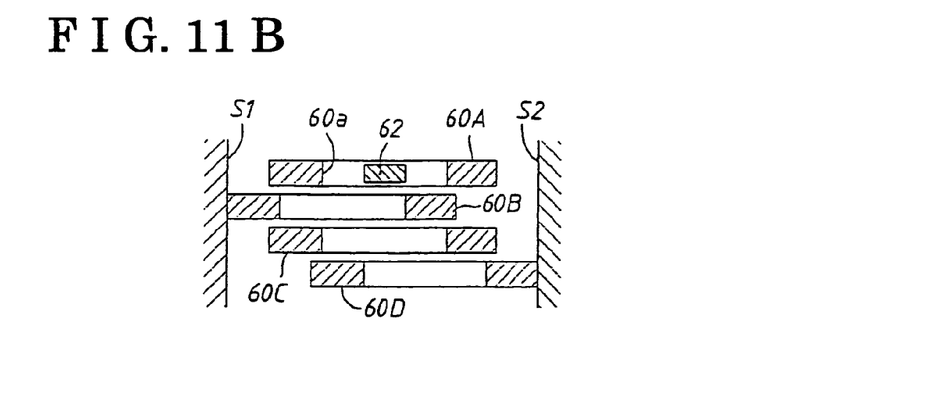

In the gearing and power transmission mechanism illustrated in FIG. 8, as described above, in the first place, a shift stage is established in the transmission by switching a gear engagement by use of the switching clutch 50 or 52 (or the switching clutch 51 or 53) of the gearing and power transmission mechanism 30A (or the gearing and power transmission mechanism 30B). In such a condition, in the eventuality of necessity of a shift operation, a next appropriate shift stage is selected by switching a gear engagement via the switching clutch 50 or 52 (or the switching clutch 51 or 53) of the gearing and power transmission mechanism 30A (or the gearing and power transmission mechanism 30B). As described above, wherever each fork head 60A to 60D is positioned, it is necessary that the shift and select member 62 positioned at a neutral position can be moved in the select direction. Therefore, as illustrated in FIG. 11(*b*), each notch 60a is designed to possess a dimension through which the shift and select member 62 can pass in the select direction wherever each fork head 60A to 60D is positioned among the one gear side; the other gear side; and the neutral position. Therefore, as illustrated in FIG. 10, a dimensional allowance D, which is superior to a shift stroke of each fork head 60A to 60D to one side, or is substantially equal thereto, is provided between one side of the shift and select member 62 at the neutral position (i.e., at an intermediate position) and one inner side of the notch 60a of each fork head 60A to 60D at the neutral position (i.e., at an intermediate position), and likewise between the other side of the shift and select member 62 and the other inner side of the notch 60a thereof.

Structures of the double clutch-type gearing and power transmission apparatus, and of the gearing and power transmission mechanism thereof, as is illustrated in FIGS. 8 to 11, are already described above.

According to the above-described conventional technology, each fork head 60A to 60D and each shift fork 61A to 61D can be held at the neutral position or at each shift position in an elastic manner by a detent device, which is configured with a ball, which is biased by a spring provided between each fork shaft (not illustrated) and a transmission casing, and plural notches elastically engaged with this ball. However, a member is not provided, which actively restrains each shift fork 61A to 61D at the neutral position, or each shift position. In this case, at a time that a strong external force is applied to each shift fork 61A to 61D, there is a danger of the shift fork of being undesirably displaced from the neutral position to one of the shift positions, or from one of the shift positions to the neutral position In this case, there is a danger of an occurrence of a gear jump out, in which a shift stage, which should actually be established in the transmission, can not be established, or of a double-gear engagement, in which a shift stage, which should not actually be established in the transmission, is undesirably established.

The present invention has been made in view of the above circumstances, and provides a twin clutch-type gearing and power transmission apparatus which is provided with an interlocking feature, by which, for example a gear jump out and a double gear engagement can be avoided.

SUMMARY OF THE INVENTION

According to an aspect of the present invention, a gearing and power transmission apparatus includes: a drive shaft of a driving power source; an output shaft of a transmission; a twin clutch assembly provided between the drive shaft and the output shaft, the twin clutch assembly comprising a first clutch and a second clutch; a first input shaft selectively connectable to the drive shaft via the first clutch; a second input shaft selectively connectable to the drive shaft via the second clutch; a first gear transmission mechanism provided between the first input shaft and the output shaft and comprising plural gear trains by which plural shift stages are respectively established; a second gear transmission mechanism provided between the second input shaft and the output shaft and comprising plural gear trains by which plural shift stages, which are different from the plural shift stages of the first gear transmission mechanism, are respectively established; plural shift forks movable in parallel with the first and second input shafts to select one of the plural shift stages by switching gear engagement of the plural gear trains in response to movement of the plural shift forks; plural fork heads, respectively connected to the plural shift forks and positioned so that tip ends of the respective fork heads overlap one another in a direction at right angles to the first and second input shafts, the respective tip ends being formed with reverse C-shaped notches; at least one shift and select member having a tip end which is movable inside the notches in the direction at right angles to the first and second input shafts to select one of the plural fork heads, the at least one shift and select member being movable, while the one of the plural fork heads is being selected, in parallel with the first and second input shafts to move the selected one of the plural fork heads to establish a shift stage in the transmission, wherein, while a shift stage is being established by one of the first and second gear transmission mechanisms, a gear engagement of an other one of the first and second gear transmission mechanisms is switched, and at least one interlock member comprising at least one restraining portion movable together with the shift and select member in the direction at right angles to the first and second input shafts, the at least one restraining portion extending in the direction at right angles to the first and second input shafts along both inner sides of the notches of the respective tip ends while the respective fork heads are positioned at a neutral position in the direction at right angles to the first and second input shafts to restrain movement of the tip ends of the respective fork heads, the at least one restraining portion comprising a gap into which the tip ends of the respective fork heads extend, the gap being at a position which corresponds to the tip end of the shift and select member, and a dimensional relationship between an outer span H1 of the tip end of each of the fork heads, an inner span H2 of the notch, an outer span P1 of the restraining portion, an inner span P2 of the restraining portion, a width I of the tip end of the shift and select member, and a shift stroke S of each of the fork heads is set to be: $H2-P1 \geqq 0$; $P2-H1+2S \geqq 0$; and $H2-2S-I \geqq 0$.

It is preferable that each value, which is generated by calculation of $H2-P1$ and $P2-H1+2S$, is set to be zero or greater than zero.

It is further preferable that the gearing and power transmission apparatus includes a shift and select shaft rotatable about an axis at right angles to the first and second input shafts and movable in an axial direction. In this case, the shift and select member is fixed to the shift and select shaft and has an inner lever that projects in a radial direction. The tip end of the shift and select member can be a tip end of the inner lever. The interlock member can be an inter lock plate mounted on the shift and select shaft to be freely rotatable and not axially movable via side plates between which the inner lever is positioned. The restraining portion can include two pairs of fingers which extend from both side portions of the both side plates of the interlock member so that the pairs of fingers face one another along both inner sides of the notches of the tip ends of the fork heads that are positioned at the neutral position. In this case, the structure of the operation mechanism of the gear transmission mechanisms can be simplified, and the number of components can be reduced. Further, it is possible to achieve a gearing and power transmission apparatus of which operation is reliable and manufacturing cost is economical.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A gearing and power transmission apparatus according to an embodiment of the present invention is described below with reference to FIGS. 1 to 9. Explanation views for explaining the twin clutch-type gearing and power transmission illustrated in FIGS. 8 and 9 explains a part of an entire structure of the apparatus according to the embodiment of the present invention. The part of the entire structure of this apparatus is identical to the aforementioned description as a background of this present invention. Therefore, detailed description of this apparatus according to the embodiment of the present invention is omitted herein. Described below is an operation mechanism having an interlocking feature, and an entire operation, for putting the first gear transmission mechanism 30A and the second gear transmission mechanism 30B into operation.

Figure 1:
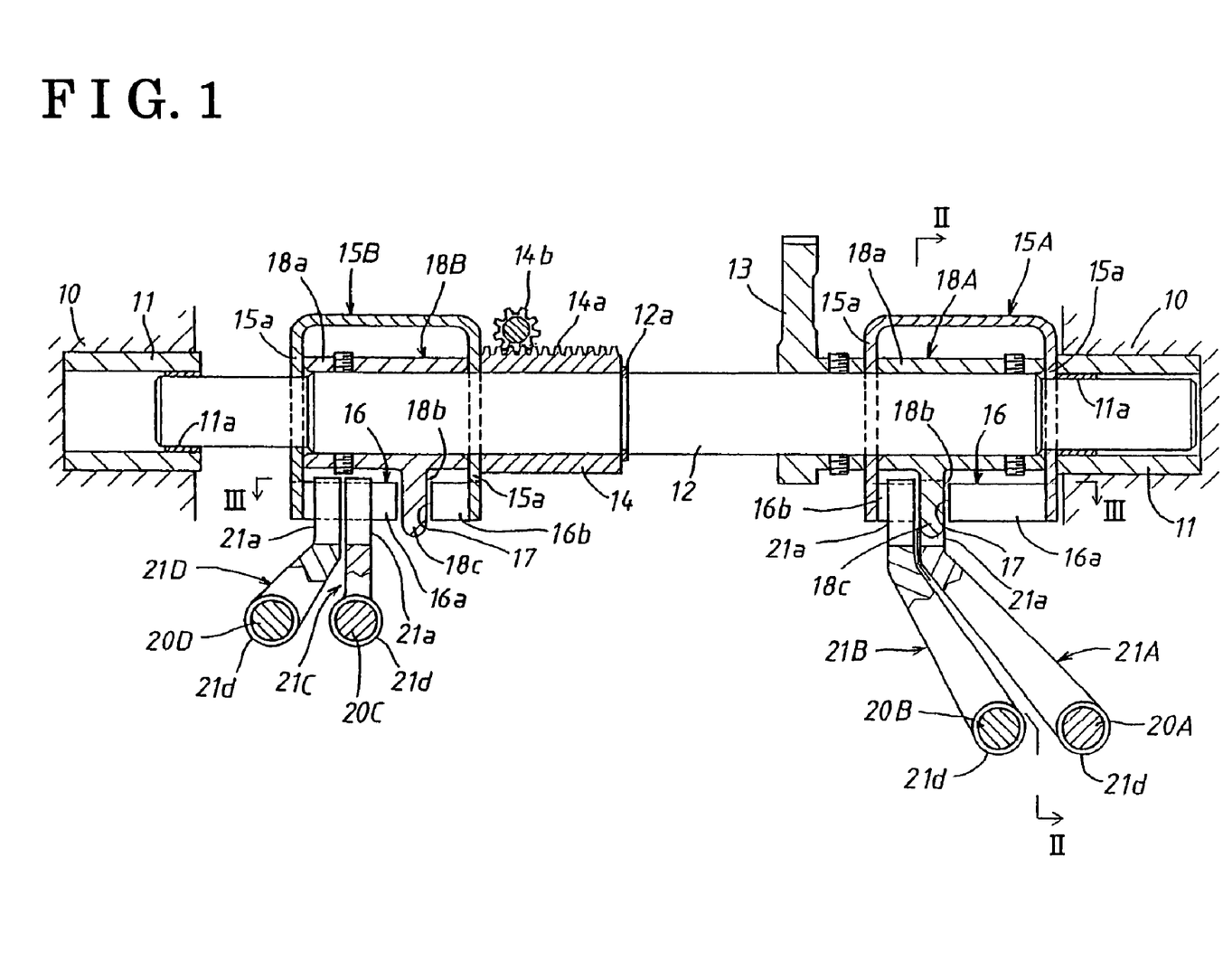
FIG. 1 is a side view of an operation mechanism for operating a gearing and power transmission mechanism of a gearing and power transmission apparatus according to an embodiment of the present invention.
Figure 2:
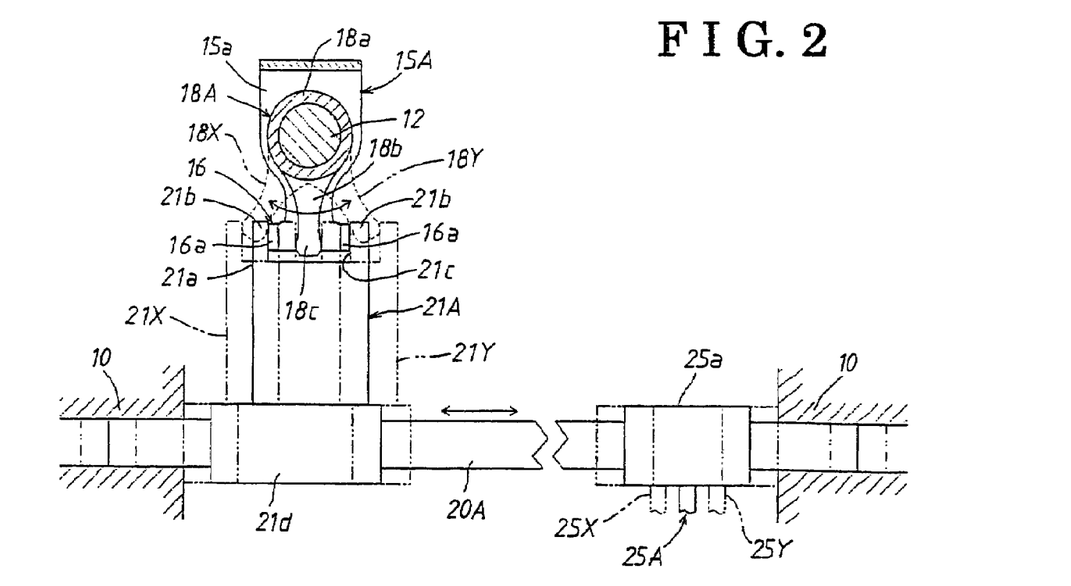
FIG. 2 is a sectional view taken along line II—II in FIG. 1.
Figure 3:
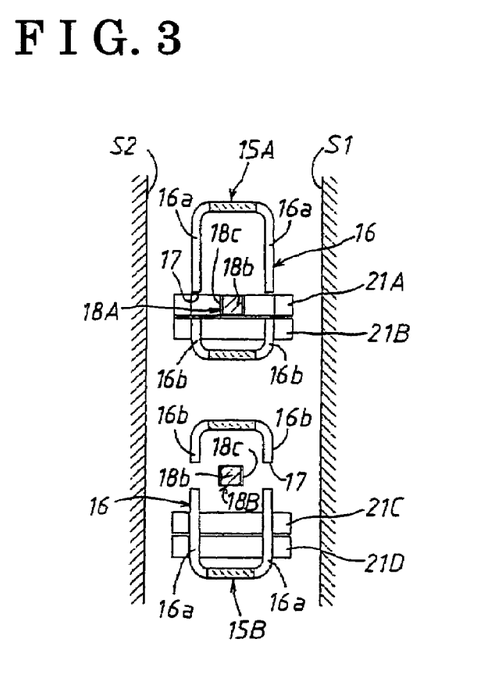
FIG. 3 is a sectional view taken along line III—III in FIG. 1.

As is illustrated in FIGS. 1 to 3, an operation mechanism having an interlocking feature is configured with a shift and select shaft 12, two shift and select members 18A and 18B, which are both mounted on the shift and select shaft 12, a first inter lock member 15A (i.e., a first inter lock plate), a second inter lock member 15B (i.e., a second inter lock plate), a first fork shaft 20A, which are both also mounted on the shift and select shaft 12, a second fork shaft 20B, a third fork shaft 20C, a fourth fork shaft 20D, fork heads 21A, 211B, 21C and 21D, which are respectively secured to the fork shafts 20A to 20D, and shift forks 25A, 25B, 25C and 25D, which are also respectively secured to the fork shafts 20A to 20D.

The shift and select shaft 12, which is illustrated in FIG. 1, extends at right angles with the input shafts 33 and 34, and the intermediate shafts 35 and 36, which both are arranged in the transmission as is illustrated in FIG. 8. The shift and select shaft 12 is further supported at both axial ends via collar joints 11 and bushings 11a by a transmission casing 10 in such a manner of being capable of rotating and axially moving. The four fork shafts 20A to 20D extend in parallel with the input shafts 33 and 34, and the intermediate shafts 35 and 36, and are supported at both axial ends by the transmission casing 10 in such a manner of being capable of axially moving.

To the first fork shaft 20A, the second fork shaft 2013, the third fork shaft 20C and the fourth fork shaft 20D, the shift forks 25A, 25B, 25C and 25D, which are respectively engaged with peripheral grooves that are defined circumferentially on outer peripheries of the switching clutches 50, 51, 52 and 53, are fixed via bosses 25a. Further, the fork heads 21A to 21D are arranged in such a manner that tip ends 21a of the respective fork heads 21A to 21D are in the vicinity of one side of the shift and select shaft 12, and are fixed to the fork shafts 20A to 20D, via bosses 21d. A pair of legs 21b projects from both sides of the tip end 21a of each fork head 21A to 21D, and a reverse-C shaped notch 21c is defined between the pair of legs 21b. The tip end 21a of the first fork head 21A overlaps the tip end 21a of the second fork head 21B, while the tip end 21a of the third fork head 21C overlaps the tip end 21a of the fourth fork head 21D.

A cylindrically shaped boss 18a of the first shift and select member 18A is fixed, by a tap bolt or a knock-pin, to a position of the shift and select shaft 12, at which the tip ends 12a of the first fork head 21A and the second fork head 21B are adjacent to each other. A cylindrically shaped boss 18a of the second shift and select member 18B is also fixed, by a tap bolt or a knock-pin, to a position of the shift and select shaft 12, at which the tip ends 12a of the third fork head 21C and the fourth fork head 21D are adjacent to each other. An inner lever 18b projects radially outwardly from an outside of the boss 18a of each shift and select member 18A and 18B. The tip end 18c of each inner lever 18b can be engaged with the notch 21c of the tip end 21a of each fork head 21A to 21D.

As is illustrated in FIGS. 1, 2 and 3, the inter lock members (the inter lock plates) 15A and 15B are respectively formed of bent plate materials, and posses an identical structure to each other. Each inter lock member 15A and 15B possesses a pair of side plates 15a which are bent in parallel with each plate thereof and holds the boss 18a of each shift and select member 18A and 18B with no clearance relative to the boss 18a. Each inter lock member 15A and 15B is freely rotatably, and yet not axially movably, supported at the shift and select shaft 12 via this pair of side plates 15a. Therefore, each inter lock member 15A and 15B is moved together with each shift and select member 18A and 18B in an axial direction of the shift and select shaft 12. The pair of side plates 15a of the inter lock member 15A is provided with a pair of first fingers 16a, which are bent from tip ends at one side of the pair of side plates 15a. The pair of side plates 15a of the inter lock member 15A is provided with a pair of second fingers 16b, which are bent from tip ends at the other side of the pair of side plates 15a. The first fingers 16a of the first inter lock member 15A extend in parallel with the shift and select shaft 12 and in a direction approaching each other (the first fingers 16a), wherein one of the first fingers 16a face the other one of the first fingers 16a in a longitudinal direction thereof. Likewise, the inter lock member 15B is provided with first fingers 16a and second fingers 16b in the same manner as the inter lock member 15A. A gap 17 is defined between an opening tip end of one of the first fingers 16a and an opening tip end of the other one of the first fingers 16a. Likewise, the gap 17 is also defined between an opening tip end of one of the second fingers 16b and an opening tip end of the other one of the second fingers 16b. At a time that each fork head 21A to 21D is positioned at a neutral (intermediate) position in a shift direction, each finger 16a and 16b extends, with some clearances relative to both inner sides of the tip ends 21a of each fork head 21A to 21D, along the inner sides thereof so as to pass through the notch 21c of each fork head 21A to 21D. The gap 17 of each inter lock member 15A and 15B is defined at a position corresponding to a position of the inner lever 18b of each shift and select member 18A and 18B, and possesses a dimension according to which the tip end 18c of each inner lever 18b and the tip end 21a of each fork head 21A to 21D is allowed to pass through the gap 17. Each finger 16a and 16b and the gap 17 is provided with a restricting portion 16, which restricts the tip end 21a of each fork head 21A to 21D from moving in a parallel direction with the shafts 33, 34, 35 and 36 apart from when each fork head 21A to 21D is selected by the inner lever 18b and is moved in a shift direction As is illustrated in FIG. 1, the shift and select shaft 12 is fixed, by a tap bolt or a knock pin, with a shift sector gear 13 at a position which is one side of the first inner lock plate 15A. Meanwhile, at one side of the second inner look pate 15B, a rack member 14 is freely rotatably mounted via a snap ring 12a. The rack member 14 is integrally formed with a rack portion 14a which extends in a longitudinal direction. This gearing and power transmission apparatus according to the embodiment of the present invention is controlled by a controller (not illustrated) which computes a shift stage that is appropriate to a current vehicle driving condition. For example, the shift and select shaft 12 is moved in an axial direction thereof when a pinion gear 14b, which is engaged with the rack portion 14a, is rotated by this controller. Accordingly, the tip end 18c of the inner lever 18b of each shift and select member 18A and 18B goes through an inside the notch 21c of the tip ends 21a of each fork head 21A to 21D, and then selects each fork head 21A to 21D sequentially. For example as is illustrated in FIGS. 1, 2 and 3, the inner lever 18b of the first inter lock member 15A first selects the first fork head 21A, and then selects the second fork head 21B. Following this operation of the first inter lock member 15A, the inner lever 18b of the second inter lock member 15B selects the third fork head 21C and the fourth fork head 21D. The shift and select shaft 12 is rotated when a pinion gear, which is not illustrated and is engaged with the shift sector gear 13, is rotated by the controller. Therefore, in response to rotation of the shift and select shaft 12, the tip end 18c of the inner lever 18b of each inter lock member 18A and 15B comes in contact with the inner side surfaces of each fork head 21A to 21D which is selected by each inner lever 18b. Further, the fork head 21A to 21D, which is selected by each inner lever 18b of each inter lock member 15A and 15B, is shifted in either a left or right direction in FIG. 2, the left and right directions which are parallel with the input shafts 33 and 34 and the intermediate shafts 35 and 36. The rotation of the inner lever 18b is illustrated with chain double-dashed lines 18X and 18Y in FIG. 2, and the movement of the fork head 21A to 21D in the shift direction is illustrated with chain double-dashed lines 21X and 21Y in FIG. 2. As a result, a switching clutch corresponding to a shift fork that corresponds to the selected fork head is operated in a shift direction and is moved to either the position at which the switching clutch is engaged with the gear at the one side; the position at which the switching clutch is engaged with the gear at the other side; and the neutral position at which the switching clutch is not engaged with these both gears.

Figure 4:
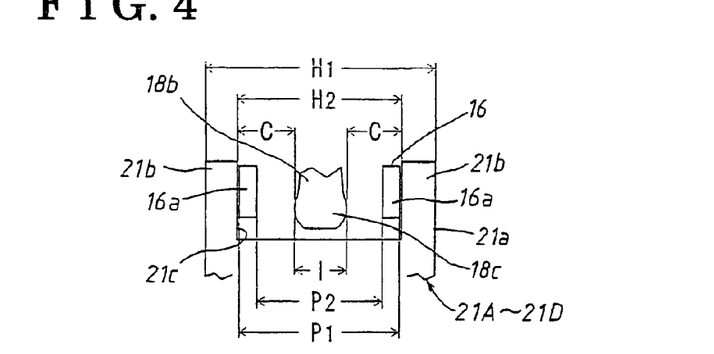
FIG. 4 is a view for explaining dimensions of each member of an inter lock mechanism illustrated in FIG. 1.
Figure 5A:
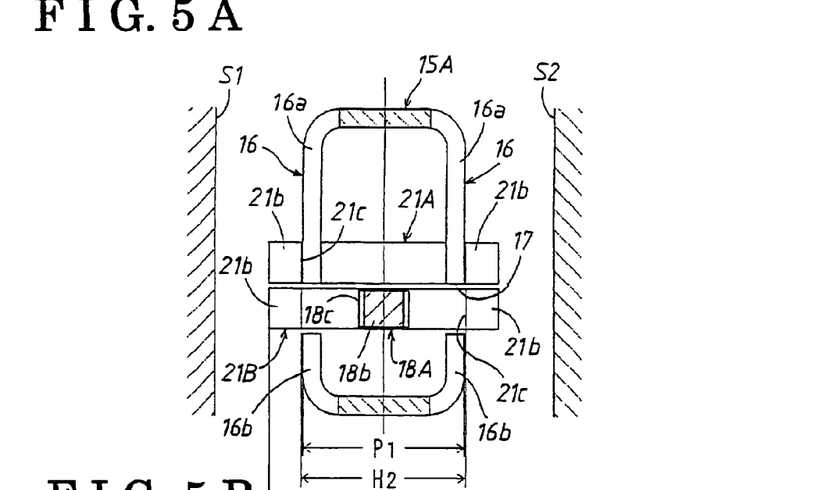
FIG. 5A is a view for explaining an operation of the inter lock mechanism illustrated in FIG. 1.
Figure 5B:
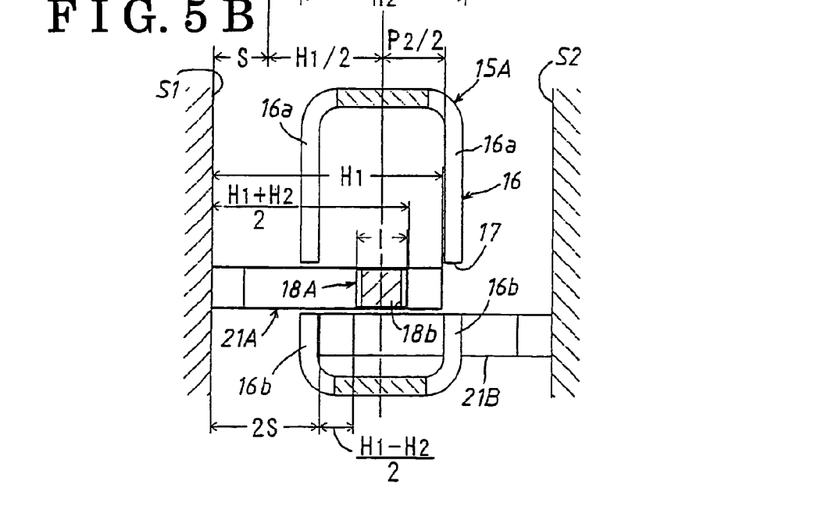
FIG. 5B is the other view for explaining the operation of the inter lock mechanism illustrated in FIG. 1.

Next, described below is, with reference to FIGS. 4 and 5, a dimensional relationship among an outer span H1, which is defined between an outer surface of one of the tip ends 21a of the fork head 21A and an outer surface of the other one of the tip ends 21a thereof, an inner span H2, which corresponds to a length of the notch 21c, an outer span P1, which is defined between an outer surface of one of the fingers 16a (16b) (i.e., the restraining portion 16) and an outer surface of the other one of the fingers 16a (16b) (i.e., the restraining portion 16); an inner span P2, which is defined between an inner surface of the one of the fingers 16a (16b) (i.e., the restraining portion 16) and an inner surface of the other one of the fingers 16a (16b) (i.e., the restraining portion 16); a width I of the tip end 18c of the inner lever 18b; and a shift stroke S of each fork head 21A to 21D. This dimensional relationship is considered to be preferable, inter alia, for the purposes of curbing a double-gear engagement and a gear jump out, and of well functioning this gearing and power transmission apparatus. Herein, the shift stroke S corresponds to a moving distance, which is defined from the time when each fork head 21A to 21D, which has been positioned at the neutral position, is moved from the neutral position in the shift direction until when the shift movement of the fork head is stopped in response to the contact of the fork head with a stopper. According to the embodiment of the present invention, as illustrated in FIG. 5, the shift movement of the each fork head 21A to 21D is stopped when the fork head impacts with any one of the stoppers S1 and S2 which are provided at both sides of the fork head. However, according to an actual production, as is illustrated in FIG. 2, the shift movement of each fork head 21A to 21D is stopped when, for example, the boss 21d, the boss 25a, a snap ring, or a stepped portion, of each fork shaft 20A to 20D, impacts with the transmission case 10. Moreover, by the same reason as the conventional technology described above, a considerably large dimensional allowance C is defined at one side of the tip end 18c of the inner lever 18b, which is positioned at the intermediate position, and one of the tip ends 21a of each fork head 21A to 21D, which is positioned at the neutral position. Likewise the considerably large dimensional allowance C is also defined at the other side of tip end 18c of the inner lever 18b, and the other one of the tip ends 21a of each fork head 21A to 21D.

In order to curb a double-gear engagement and a gear jump out, as is illustrated in FIG. 5A, it is necessary that a shift movement of any fork head be restrained by the restraining portion 16, apart from when the fork head is selected by the inner lever 18b. It is further necessary that, when the inner lever 18b is positioned at the neutral position, the shift and select member 18A and the inter lock member 15A be capable of moving in the select direction. Therefore, as is apparent from FIG. 5A, the dimensional relationship between the inner span H2 of the notch 21c and the outer span P1 of the restraining portion 16 can be established as which the inner span H2 is not less than the outer span P1 (H2≧P1, i.e., H2−P1≧0). In this case, in connection with the first fork head 21A, which is not selected by the inner lever 18b of the first shift and select member 18A, the outer surfaces of the first fingers 16a of the first inter lock member 15A impact with the inner surfaces of the tip ends 21a of the first fork head 21A, wherein the movement of the first fork head 21A in the shift direction can be effectively restrained. Moreover, as is apparent from FIG. 5A, in response to further movement of the shift and select member 18A and the inter lock member 15A in the select direction, the inner lever 18b of the first inter lock member 18A selects the first fork head 21A, and terminates selecting the second fork head 21B. Therefore, the outer surfaces of the second fingers 16b of the first inter lock member 15A impact with the inner surfaces of the tip ends 21a of the second fork head 21B, wherein the movement of the second fork head 21B in the shift movement can be effectively restrained.

As is illustrated in FIG. 5B, at a time when any fork head is shifted in the left or right direction in FIG. 5B impact the stopper S1 or S2, the fork head is restrained, by the restraining member 16, from returning to the neutral position, apart from when the fork head is being selected by the inner lever 18b. Further, when the inner lever 18b is positioned at the neutral position, it is necessary that the shift and select member 18A and the inter lock member 15A can be moved in the select direction. Therefore, as is apparent from FIG. 5B, the dimensional relationship between the outer span H1 of the fork head, the inner span P2 of the fingers 16a (16b) (i.e., the restraining portion 16), and the shift stroke S of the fork head can be established as which the outer span H1 is not greater than a total of the shift stroke S and a half as much as the sum of the outer span H1 and the inner span P2 (H1≦S+(H1+P2)/2, i.e., P2−H1+2S≧0). In this case, in connection with the second fork head 21B, which is not selected by the inner lever 18b of the first shift and select member 18A, an outer end of the second fork head 21B, which is positioned at the opposite side to the stopper S2, impacts with the inner surface of one of the second finger 16b of the first inter lock member 15A, wherein the second fork head 21B is restrained from returning to the neutral position. Moreover, in order to move the shift and select member 18A and the inter lock member 15A, which are both positioned at the neutral position, in the select direction, as is apparent in FIG. 5B, the dimensional relationship among the outer span H1 of the fork head, the inner span H2 of the fork head, the stroke S of the fork head, and the length I of the inner lever 18b can be established as I≦(H1+H2)/2−(H1−H2)/2−2S, i.e., H2−2S−I≧0. In this case, the shift and select member 18A can go through the notches 21C, of the first fork head 21A, and of the second fork head 21B, and then can be movable in the select direction. Further, in response to the movement of the first shift and select member 18A and the first inter lock member 15A in the select direction, the inner lever 18b selects the second fork head 21B and terminates selecting the first fork head 21A. Therefore, the outer end of the first fork head 21A, which is positioned at an opposite side to the stopper S1, impacts with the inner surfaces of the first fingers 16a of the first inter lock member 15A, wherein the return of the first fork head 21A to the neutral position can be effectively restrained.

As described above, the operation of the first shift and select member 18A and the inter lock member 15A has been already described. The operation of the second shift and select member 18B and the second inter lock member 15B is identical to the above description. Further, according to the embodiment of the present invention, in order to minimize the moving amount of each fork head 21A to 21D in the shift direction and to hold each switching clutch 50 to 53 at an appropriate position, a value of "H2−P1" and a value of "P2−H1+2S" is designed to approximate to zero as much as possible. Because each member elastically deforms, even if these values are designed to be zero, there is no danger of each inter lock member 15A, 15B, and each shift and select member 18A and 18B of malfunctioning in the select movements.

Figure 6:
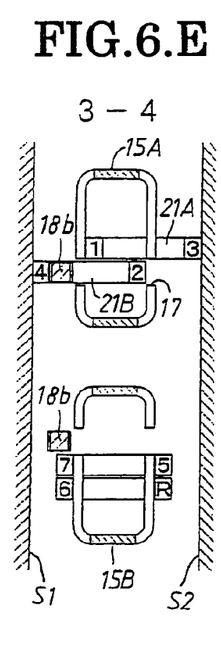
FIGS. 6A to 6H are views for explaining an entire operation of the gearing and power transmission mechanism according to the embodiment of the present invention.
Figure 6A:
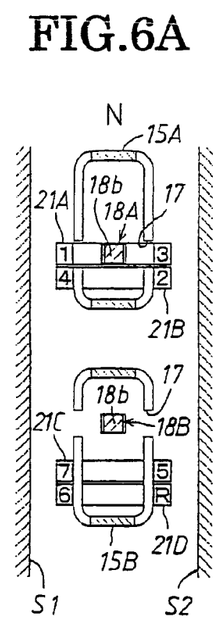
Figure 6B:
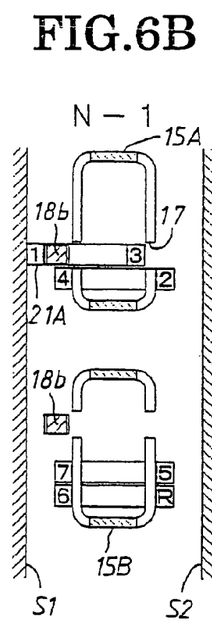

Next, described below is, with reference to FIG. 6, an overall operation at a time that the gearing and power transmission apparatus according to the embodiment of the present invention is applied to a vehicle. When this gearing and power transmission apparatus is not operating, as is illustrated in FIG. 6A, each fork head 21A to 21D has been located at the neutral position, the first fork head 21A has been selected by the inner lever 18b of the first shift and select member 18A, and the first clutch 32a and the second clutch 32b have been both released from being engaged. On the other hand, when the engine, which is connected to the drive shaft 31, is activated, as is illustrated in FIG. 6B, the controller (not illustrated) operates the inner lever 18b of the first shift and select member 18A so as to shift the first fork head 21A to a first shift stage side. Therefore, a power transmission path by use of the first shift stage gear train 40 can be established via the first switching clutch 50 of the first gearing and power transmission mechanism 30A. In such circumstances, at an event that the throttle opening degree is increased, and an engine rotational speed reaches a predetermined rotational speed, the first clutch 32a is engaged, wherein the vehicle starts driving at the first shift stage established by the first gearing and power transmission mechanism 30A.

Figure 6C:
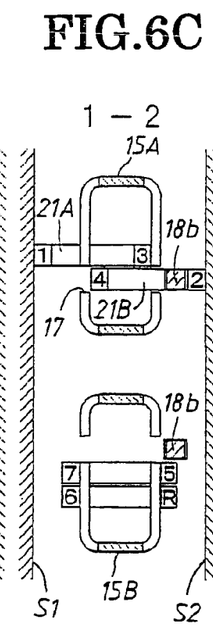

While the vehicle is driving at the first shift stage, the controller operates the shift and select shaft 12 in preparation for the shift-up operation to the second shift stage. As is illustrated in FIG. 6C, the controller operates the inner lever 18b of the first shift and select member 18A so as to shift the second fork head 21B to a second shift stage side.

Therefore, a power transmission path by use of the second shift stage gear train 41 can be established via the second switching clutch 51 of the second gearing and power transmission mechanism 30B. In such circumstances, at an event that the vehicle driving condition becomes appropriate to the vehicle driving at the second shift stage, the controller terminates engagement of the first clutch 32a and establishes engagement of the second clutch 32b, wherein the vehicle driving is switched from the first shift stage mode to the second shift stage mode established by the second gearing and power transmission mechanism 30B.

Figure 6D:
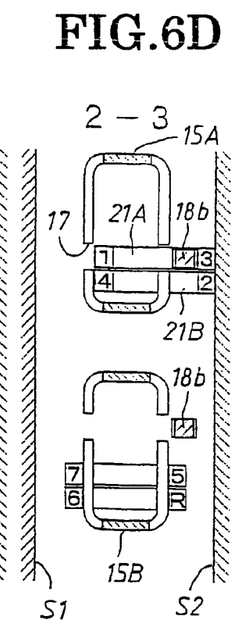
Figure 6F:
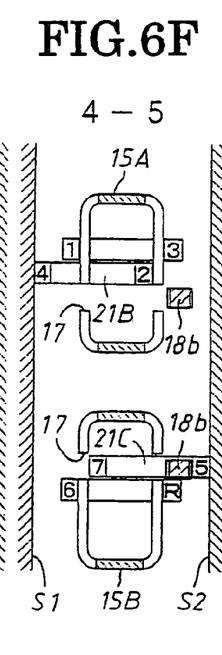
Figure 6G:
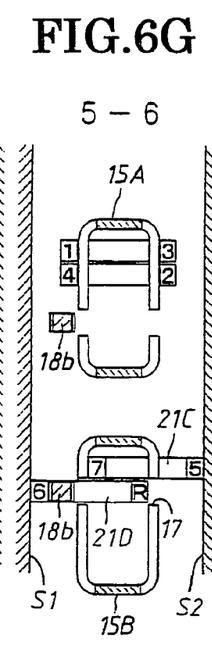
Figure 6H:
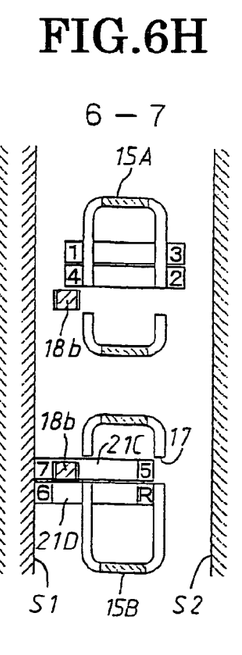

When the vehicle driving condition is continuously appropriate to a shift-up operation, as is illustrated in FIG. 6D, the controller operates the shift and select shaft 12. In response to the select and shift movement of the shift and select shaft 12, the inner lever 18b, which has selected the first fork head 21A, is shifted from the first shift stage side to a third shift stage side. Therefore, a power transmission path by use of the third shift stage gear train 42 can be established via the first switching clutch 50 of the first gearing and power transmission mechanism 30A. In such circumstances, at an event that the vehicle driving condition becomes appropriate to the vehicle driving at the third shift stage, the controller terminates engagement of the second clutch 32b and establishes engagement of the first clutch 32a, wherein vehicle driving is switched from the second shift stage mode to the third shift stage mode established by the first gearing and power transmission mechanism 30A.

As described above, when the vehicle driving condition is still continuously appropriate to a shift up operation, as is illustrated in FIGS. 6E to 6H, one of the fork heads 21A to 21D is selected and shifted by the shift and select member 18A or 18B, the corresponding switching clutch 50 to 53 is operated. A gear train for a shift stage which is one shift stage lower than a currently selected shift stage is then disengaged, and a gear train for a shift stage which is one shift stage higher than the currently selected shift stage is engaged. In such circumstances, at an event that the vehicle driving condition becomes appropriate to the shift stage which is one higher than the currently selected shift stage, the engagement of the twin-clutch assembly 32 is switched. The shift stage established in the gearing and power transmission is switched by repeatedly performing a shift-up operation as described above. Prior to selecting and shifting one of the fork heads 21A to 21D by the shift and select member 18A or 18B, each inner lever 18b is returned to the neutral position on the basis of commands from the controller.

Figure 12:
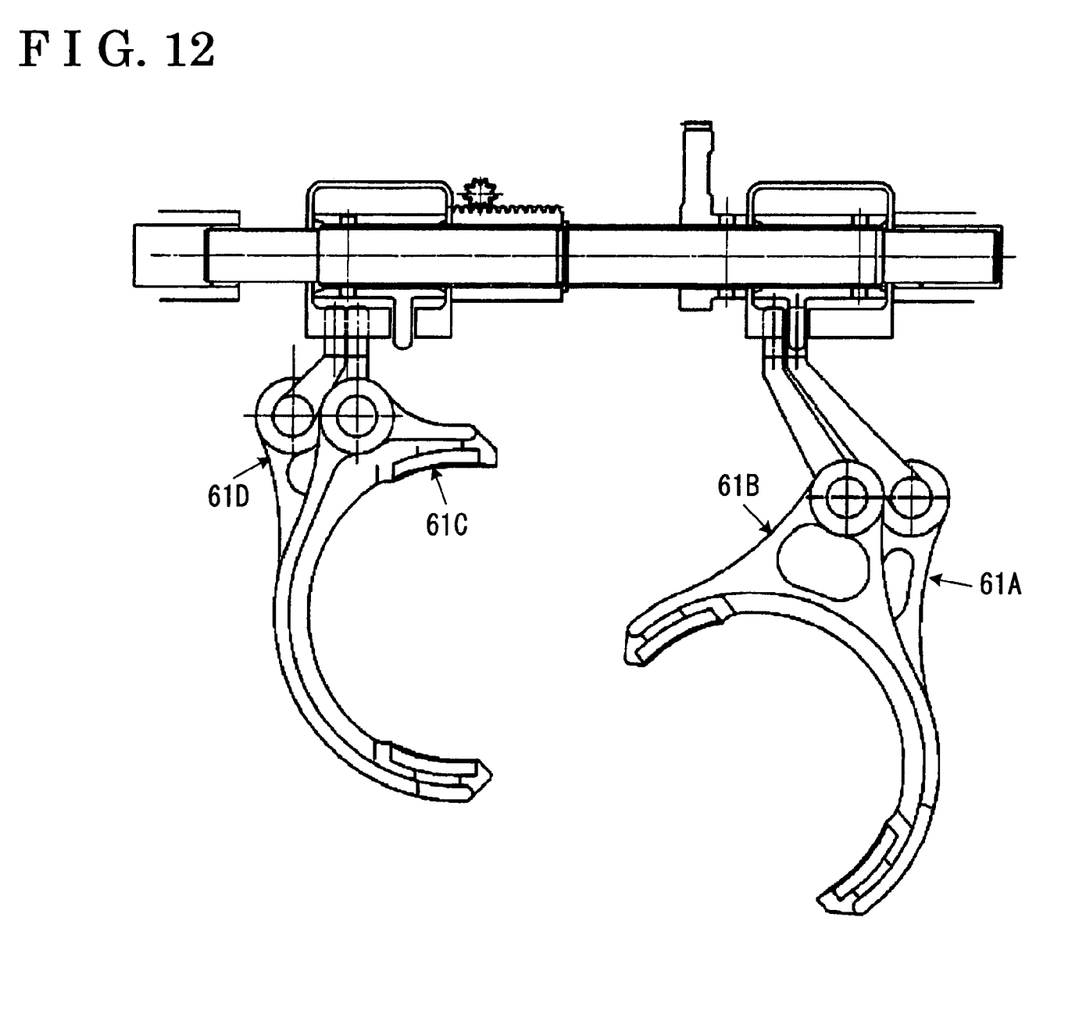
FIG. 12 is a view schematically illustrating shift forks.

When the selected shift stage is appropriate to the current vehicle driving condition, the controller does not switch the operations, of the fork heads 21A to 21D, of the switching clutches 50 to 53, and of the clutches 32a and 32b, and maintain the current condition. When the vehicle driving condition becomes appropriate to a shift-down operation, the controller selects and shifts one of the fork heads 21A to 21D by the shift and select member 18A or 18B, and operates the corresponding clutch 50 to 53. Therefore, the controller disengages a gear train for a shift stage which is one shift stage higher than the currently selected shift stage, and engages a gear train for a shift stage which is one shift stage lower than the currently selected shift stage. When the vehicle driving condition becomes appropriate to the driving at the shift stage that is one shift stage lower than the currently selected shift stage, the engagement of the twin-clutch assembly 32 is switched. The shift-down operation is achieved by repeatedly performing the above description According to the embodiment of the present invention, as described above, a shift stage, which corresponds to the vehicle driving condition, is automatically selected by the controller. Further, wherever the tip ends 21a of each fork head 21A to 21D are positioned, at the neutral position or at any of the shift positions, each inner lever 18b can go through inside of the notch 21c of the fork head in a right-angled direction with the input shafts 33 and 34, and can move the fork head from the neutral position to any of the shift positions, or return the fork head to the neutral position. Still further, apart from when each fork head 21A to 21D, which is located at the neutral position, is selected by the shift and select member 18A or 18B, the inner surfaces of the notch 21c of each fork head impact the outer surfaces of the fingers 16a and 16b (i.e., the restraining portions 16) of each interlock member 15A and 15B, wherein the fork head is restrained from moving in the shift direction. Still further, apart from when each fork head 21A to 21D, which is positioned at any of the shift positions, is being selected by the shift and select member 18A or 18b, the one outer end of the fork head impact with the inner sides of the fingers 16 and 16b (i.e., the restraining portions 16), wherein the fork head is restrained from returning. Therefore, even when a strong outer force is applied to each shift fork 61A to 61D (illustrated in FIG. 12), each fork head is not displaced to a position that is beyond expectation. Therefore, there is no danger of a shift stage, which should be actually established, of not being established, or no danger of a shift stage, which should not be actually established, of being established.

Further according to the embodiment of the present invention, the value of "H2−P1" and the value of "P2−H1+2S" are designed to approximate to zero as much as possible, or to be considerably greater than that. Therefore, each fork head 21A to 21D, which has been confined to the neutral position or at the shift position, can be controlled to move only few in the shift direction. Therefore, it is possible to maintain each switching clutch 50 to 53 at an appropriate position with high accuracy, and to switch engagement of each gear train with high precision.

Figure 7:
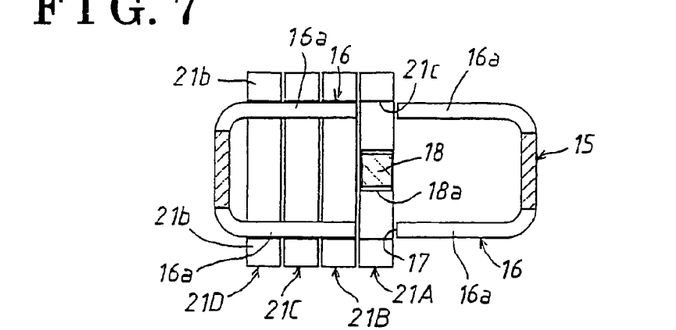
FIG. 7 is a view illustrating a modification from the operation mechanism for operating the gearing and power transmission mechanism of this apparatus according to the embodiment of the present invention.

Still further according to the embodiment of the present invention, the tip ends 21a of the first and second fork heads 21A and 21B are overlapped separately from the tip ends 21a of the third and forth fork heads 21C and 21D, which are also overlapped. Moreover, the interlock members 15A and 15B, which both restrain the shift movements of the fork heads, are individually provided for the shift heads 21A, 21B and for the shift heads 21C, 21D. However, the structure is not limited to the above. As is illustrated in FIG. 7, these four fork heads 21A to 21D can all overlap one another, and the inter lock member 15, which restrains the shift movements of the fork heads 21A to 21D can be provide in the singular. Still further, according to the embodiment of the present invention, there are four fork heads 21A to 21D provided. However, the structure is not limited to the above, and the number of fork heads 21A to 21D can be any.

The principles, the preferred embodiment and mode of operation of the present invention have been described in the foregoing specification However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A gearing and power transmission apparatus comprising:
   a drive shaft of a driving power source;
   an output shaft of a transmission;
   a twin clutch assembly provided between the drive shaft and the output shaft, the twin clutch assembly comprising a first clutch and a second clutch;
   a first input shaft selectively connectable to the drive shaft via the first clutch;
   a second input shaft selectively connectable to the drive shaft via the second clutch;
   a first gear transmission mechanism provided between the first input shaft and the output shaft and comprising plural gear trains by which plural shift stages are respectively established;
   a second gear transmission mechanism provided between the second input shaft and the output shaft and comprising plural gear trains by which plural shift stages, which are different from the plural shift stages of the first gear transmission mechanism, are respectively established;
   plural shift forks movable in parallel with the first and second input shafts to select one of the plural shift stages by switching gear engagement of the plural gear trains in response to movement of the plural shift forks;
   plural fork heads respectively connected to the plural shift forks and positioned so that tip ends of the respective fork heads overlap one another in a direction at right angles to the first and second input shafts, the respective tip ends being formed with reverse C-shaped notches;
   at least one shift and select member having a tip end which is movable inside the notches in the direction at right angles to the first and second input shafts to select one of the plural fork heads, the at least one shift and select member being movable, while the one of the plural fork heads is being selected, in parallel with the first and second input shafts to move the selected one of the plural fork heads to establish a shift stage in the transmission, wherein, while a shift stage is being established by one of the first and second gear transmission mechanisms, a gear engagement of an other one of the first and second gear transmission mechanisms is switched, and
   at least one interlock member comprising at least one restraining portion movable together with the shift and select member in the direction at right angles to the first and second input shafts, the at least one restraining portion extending in the direction at right angles to the first and second input shafts along both inner sides of the notches of the respective tip ends while the respective fork heads are positioned at a neutral position in the direction at right angles to the first and second input shafts to restrain movement of the tip ends of the respective fork heads, the at least one restraining portion comprising a gap into which the tip ends of the respective fork heads extend, the gap being at a position which corresponds to the tip end of the shift and select member, and a dimensional relationship between an outer span $H1$ of the tip end of each of the fork heads, an inner span $H2$ of the notch, an outer span $P1$ of the restraining portion, an inner span $P2$ of the restraining portion, a width $I$ of the tip end of the shift and select member, and a shift stroke $S$ of each of the fork heads is set to be: $H2-P1 \geqq 0$; $P2-H1+2S \geqq 0$; and $H2-2S-I \geqq 0$.

2. A gearing and power transmission apparatus according to claim 1, wherein each value, which is generated by calculation of $H2-P1$ and $P2-H1+2S$, is set to be zero or greater than zero.

3. A gearing and power transmission apparatus according to claim 1, further comprising a shift and select shaft rotatable about an axis at right angles to the first and second input shafts and movable in an axial direction, the shift and select member being fixed to the shift and select shaft and having an inner lever that projects in a radial direction, the tip end of the shift and select member being a tip end of the inner lever, the interlock member being an inter lock plate mounted on the shift and select shaft to be freely rotatable and not axially movable via side plates between which the inner lever is positioned, and the restraining portion comprising two pairs of fingers which extend from both side portions of the both side plates of the interlock member so that the pairs of fingers face one another along both inner sides of the notches of the tip ends of the fork heads that are positioned at the neutral position.

4. A gearing and power transmission apparatus according to claim 2, further comprising a shift and select shaft rotatable about an axis at right angles to the first and second input shafts and movable in an axial direction, the shift and select member being fixed to the shift and select shaft and having an inner lever that projects in a radial direction, the tip end of the shift and select member being a tip end of the inner lever, the interlock member being an inter lock plate which is mounted on the shift and select shaft via side plates so that the inner lever is positioned between the side plates, and the restraining portion comprising two pairs of fingers which extend from both side portions of both side plates of the interlock member so that the pairs of fingers face one another along both inner sides of the notches of the tip ends of the fork heads that are positioned at the neutral position.

* * * * *